Patented Aug. 17, 1943

2,326,812

UNITED STATES PATENT OFFICE 2,326,812

INJECTION MOLDING POWDER

David R. Wiggam, West Grove, Pa., and William Koch, Wilmington, Del., assignors to Hercules Powder Company, Wilmington, Del., a corporation of Delaware No Drawing. Application March 30, 1940, Serial No. 326,970

17 Claims. (Cl. 106—173)

This invention relates to injection molding powders. More particularly it relates to injection molding powders, moldings from which do not warp or cold-flow and which are based upon ethyl cellulose.

Heretofore successful cellulosic injection molding plastics have been based entirely upon organic esters of cellulose such as cellulose acetate. The plastics have consisted of about 50-75% of the cellulose ester and about 25-50% of one or more plasticizers included to impart the required flow properties at injection temperatures and to impart sufficient toughness at ordinary temperatures to withstand the impacts of use. Moldings of such plastics have several disadvantages. After some time they warp, shrink, and crack around inserts. These defects are caused by cold flow of the plastic and also by the slight volatility of the plasticizers which must be used. The plastics heretofore successfully injected are true thermoplastic solutions which flow to a small but definite extent under the stresses of use or under the stresses set up in the rapid cooling of the molding in the die. Under humid conditions or upon exposure to water these changes are greatly accelerated. In addition, the cellulose ester injection molding plastics are distinctly brittle at very low temperatures such as are encountered outdoors in winter. Furthermore, they do not withstand alkalies such as soaps and washing soda.

Attempts to overcome these disadvantages by using cellulose derivatives other than the esters have not been successful. For example, when attempting to formulate cellulose ethers such as ethyl cellulose according to the knowledge of the injection molding art by the compounding of ethyl cellulose with plasticizers, it has been found that if insufficient plasticizer is used, poor flow results, and a laminated structure which is weak and which may show lines of incomplete flowing together, is obtained. Frequently, a laminated or fibrillated structure is obtained which is accompanied by a defect known as "pick-up." "Pick-up" describes the property of forming fibrillations upon the surface of the plastic molding upon rubbing, buffing, sanding, etc. When sufficient solvent plasticizer is used to overcome these conditions, the plastic is invariably too soft to be buffed or polished and it may, in addition, cold flow excessively at the temperatures of use. Thus the special requirements of flow, etc. required of injection molding powder based on ethyl cellulose have never been combined with acceptable properties in the finished molding.

It is an object of this invention to provide an injection molding powder characterized by good flow properties at injection temperatures.

It is a further object to provide an injection molding powder which gives moldings free from appreciable cold flow over a long period of time at the ordinary temperatures of use.

It is a still further object to provide an injection molding powder capable of giving moldings free from the defects of warping, shrinking, or cracking around inserts in use.

It is a still further object to provide injection molding powder capable of giving moldings which do not warp, shrink, or crack when exposed to humid conditions or to periodic immersion in warm water.

It is a still further object to provide an injection molding powder capable of giving molded articles which retain their toughness and strength at extremely low temperatures such as below 0° F.

It is a still further object to provide injection molding powders capable of giving moldings resistant to soaps, washing soda, and other weak alkalies or strong alkalies.

It is also an object to provide an injection molding powder based upon ethyl cellulose having the hereinabove mentioned desirable properties.

It is also an object to provide an ethyl cellulose injection molding powder capable of injection to a strong non-laminated, non-fibrillated structure.

It is also an object to provide an ethyl cellulose injection molding powder capable of injection to a tough, hard molding free from the defect of "pick-up."

It is also an object to provide an ethyl cellulose injection molding powder capable of being injected to form a molding free of structural and surface defects and which is at the same time sufficiently hard to be polished.

It is also an object of this invention to provide an ethyl cellulose injection molding powder capable of injection to a tough molding which is at the same time substantially without cold flow and hard enough to be polished and to withstand usage.

Now according to this invention these objects are attained by injection molding powders based on a certain type of ethyl cellulose in combination with resins imparting certain solvent or flow properties to the ethyl cellulose, in the proportion of about 65% to about 90% ethyl cellulose and about 5% to about 35% of the resin. These percentages are by weight of the molding powder. The injection molding powder may comprise fillers, coloring matter, lubricants, plasticizers, etc., in limited quantities, if desired. Preferably the ingredients are in a substantially homogeneous colloided form.

Surprisingly enough the use of resins does not necessarily give brittle injection moldings. Injection moldings made from the injection molding powder according to this invention are tough, having high impact strength. At the same time they are hard, having a hardness of at least 10 on the Rockwell M scale. Contrary to the established belief of the art, solvent plasticizers may be eliminated altogether, if desired. If used at all, solvent plasticizers will, in fact, be held below a definite rather low maximum.

The ethyl cellulose which is utilized according to this invention must have an ethoxyl content within the range between about 43% and about 50%. Preferably, the ethoxyl content is within the range between about 44% and about 47%. It has also been found that to obtain strong, impact-resistant, non-laminated and non-fibrillated moldings, the viscosity characteristic of the ethyl cellulose should be greater than about 50. This viscosity characteristic, as used herein, is the viscosity in centipoises at 25° C. of a solution consisting of 5% ethyl cellulose and 95% of a solvent which in turn consists of 70% of toluene and 30% of ethyl alcohol. Preferably, the viscosity characteristic is within the range of about 70 and about 300. If the viscosity characteristic is above about 500, it is difficult to obtain moldings having a non-laminated structure and hence it has been found desirable, as a rule, to work with material below this viscosity.

The resins which are utilized in preparing the molding powder according to this invention possess solvent action for the ethyl cellulose utilized at injection molding temperatures but possess substantially no solvent action at temperature of about 100° F. By solvent action at injection molding temperatures is meant the ability to impart smooth fluid flowability to the ethyl cellulose which the ethyl cellulose would not otherwise possess at the temperatures referred to. The required solvent action at injection temperatures is readily determinable as it involves the property of forming a homogeneous uniform colloidal solution at a temperature of about 350° F., or at a lower temperature, upon the resin being mixed with the said ethyl cellulose in the proportion of 70 parts of ethyl cellulose and 30 parts of resin at the said temperature on a differential roll mill, or in a Banbury mixer, for a period of 20 minutes or less in the absence of mutual solvents. Usually solvent action as exhibited by this test is sufficient. However, the existence of the solvent action required is conclusively determined by injecting the homogenized 70:30 mixture into a mold using an ordinary injection molding press. If by injection at a temperature of 400° F. or at any lower temperature, a molding is obtained which has a structure substantially free of visible laminations and free of pick-up upon rubbing, the resin utilized has the high temperature solvent action required.

The resin utilized also possesses substantially no solvent action for the ethyl cellulose at temperatures of normal use, say at temperatures below 100° F., or at temperatures of the order of about 100° F. Solvent action is again measured by ability to impart appreciable flow to an ethyl cellulose composition which the ethyl cellulose alone does not possess at the temperature in question. The resins utilized according to this invention impart substantially no tendency to flow in ordinary use at room temperatures, or ordinary washing temperatures, and it may be categorically stated that they impart no more than a certain definite measurable tendency to flow at useful temperatures.

This flow imparting or solvent action property is measured according to Method D48–39, American Society for Testing Materials Standards, 1939, part III, page 250, using a test piece injection-molded from a powder consisting of 30% of the resin under test and 70% of ethyl cellulose having an ethoxyl content of 47.5% and a viscosity of 96, the two components being uniformly colloided by a hot roll or Banbury mill in the absence of any added solvents. In this test, the standard size test piece is loaded with 5.5 pounds as for a flexure test and the temperature gradually raised at a rate of about 0.9° F. per minute, starting at about 68° F. and continuing until the specimen has distorted 10 mils (0.254 mm.). The resulting distortion or flow tendency, which thus measures tendency to cold flow, is expressed by this test as the temperature at which a 10 mil distortion is first obtained. The resin utilized in accordance with this invention will have a distortion test value of at least 100° F. by the hereinbefore mentioned A. S. T. M. test; or expressed in another way it must be heated for at least 36 minutes, starting at 68° F., at a rate of temperature increase of about 0.9° F. (no greater than 1° F.) per minute before obtaining a 10 mil distortion by the said test. It will be understood that the expression "substantially no solvent action at temperatures of about 100° F." is defined herein as referring to a resin meeting the requirements set forth following the A. S. T. M. test.

In addition, the resins utilized in accordance with this invention do not impart softness to the ethyl cellulose in the ranges utilized. For example, the 70:30 test bars hereinbefore described will have a hardness in excess of 10 on the Rockwell hardness M scale at room temperature (68°–75° F.). Materials giving lower values than 10 are not resins according to this invention but are to be considered as solvent plasticizers of ethyl cellulose.

The resin utilized will also be compatible with the ethyl cellulose utilized at temperatures of use, i. e. will not separate or cloud upon cooling compositions in the ranges hereinbefore mentioned to temperatures of 0–100° F.

It is believed that with resins characterized by substantially no solvent action at about 100° F., a colloidal gel structure, as distinguished from a colloidal solution, is formed upon cooling a molding made from the injection molding powder of this invention. It is believed the superior properties of such moldings is explained thereby.

Resins which have been found to possess a solvent action for ethyl cellulose at injection temperatures and substantially no solvent action at temperatures of about 100° F. include those resins rich in natural resin acids or hydrogenated resin acids or derivatives of these resins or resin acids. Resins containing the rosin acid structures, for example, gum rosin, wood rosin, rosin acids including abietic, pimaric, sapinic and similar acids; hydrogenated rosin, hydrogenated rosin acids; resins comprising essentially esters of gum or wood rosin or hydrogenated wood or gum rosin with polyhydric alcohols such as ethylene glycol, glycerol, erythritol, pentaerythritol, sorbitol, mannitol, trimethylene glycol, etc.; also esters derived from rosin or hydrogenated rosin of the character mentioned modified by (or modifying) maleate esters, esters of terpene-maleic anhydride condensates, succinate esters and other polybasic acid esters of polyhydric alcohols; and also rosin and rosin esters modified by reaction with oil soluble phenolic or urea-formaldehyde resins and the like have been found particularly suitable. Batavia and other dammars (dewaxed or undewaxed), sandarac, manila, run congo, kauri, shellac (dewaxed or undewaxed), pine wood resin substantially insoluble in volatile petroleum hydrocarbons, etc., have also been found suitable. Certain oil soluble phenolic, urea-aldehyde, oil modified alkyd, pure alkyd, cumarone, and vinyl polymer resins have been found to have the solvent action properties desired. It will, of course, be appreciated that the resins utilized must be compatible and have the solvent action characteristics hereinabove described.

The proportions of ethyl cellulose and resin in the injection molding powders of this invention will be between about 65% and about 90% of ethyl cellulose and between about 5% and 35% of the resin. The percentages are by weight of the injection molding powder. Preferably, the ethyl cellulose will comprise between about 70% and about 85% of the composition. Preferably, the resin will comprise no more than about 20% of the composition, say between about 10% and about 20% of the composition. Preferably, the sum of ethyl cellulose and resin will be at least 75% of the injection molding powder.

A limited quantity of solvent plasticizer is optional in the injection molding powder of this invention; such materials find use where maximum speed of compounding and maximum speed in injection molding are required. However, where used, no more solvent plasticizers than about 17.5% by weight of the molding powder should be included, say about 7½% to about 15%, and in no case should sufficient plasticizer to lower hardness of moldings below 10 on the Rockwell M Scale be used. Greater amounts of solvent plasticizer cause excessive softness, precluding buffing, polishing, etc. Solvent plasticizers which may be used in the limited quantity mentioned are such as, for example, dibutyl phthalate, diamyl phthalate, dibutylcellosolve phthalate, tricresyl phosphate, triphenyl phosphate, xenyl diphenyl phosphate, chlorinated diphenyl, chlorinated naphthalene, camphor, castor oil, ethyl orthobenzoyl benzoate, etc.

Fillers may also be incorporated in the injection molding powders according to this invention. By filler is meant a relatively inert material which is unreactive with the other ingredients of the molding powder and which is not a solvent for ethyl cellulose. Fillers may be added to cheapen the molding powder, to color it, or to control its opacity, to provide lubrication, etc. Fillers will be used only in a quantity insufficient to detract materially from the strength and hardness of the moldings obtained from the molding powder. The total quantity of the various fillers or of fillers plus any plasticizers used will in general be no more than about 25% of the molding powder.

The filler may be an inert liquid such as a substantially non-volatile liquid fraction of a mineral oil, or of a hydrogenated, cracked or polymerized petroleum product, for example, a white refined non-volatile mineral oil such as Nujol, Fractol, etc.; SAE 20, 30, and 40 engine lubricating oil, etc. The liquid fillers are especially advantageous in reducing the cost of the molding powder. They have in general little effect on the hardness of the moldings unless used in rather large quantities and they have no tendency to cause cold flow. They may promote mold release, impart water resistance, and aid in forming a gel structure. Liquid fillers are utilized in a quantity less than about 20% of the molding powder and also held to a quantity less than will cause sweating in the particular composition in which they are used. Where a liquid filler is included, preferably it will comprise between about 5% and about 15% of the molding powder.

Molding lubricants are included herein as fillers since they have little influence on the physical properties of the moldings aside from their lubricating action. They improve mold release and the surface of the molding and facilitate polishing. Molding lubricants are used in quantities less than sufficient to decrease appreciably the strength and hardness of the moldings. Preferably, they are used in a quantity between about 0.1% and about 5% of the molding powder. Suitable molding lubricants may be waxy substances such as, for example, Japan wax, carnauba wax, montan wax, paraffin wax, stearic acid; soaps such as, for example, aluminum stearate, aluminum palmitate, calcium stearate; and the like.

Pigments for coloring and other solid inert materials included as fillers may be used if desired. They will be used in quantities less than sufficient to decrease appreciably the strength and toughness of the moldings. Where they are included, these fillers are used in quantities below about 20% and preferably in quantities between about 0.3% and about 5% of the molding powder. Suitable materials of this nature are such as, for example, whiting, china clay, powdered silica, barium sulphate, calcium sulphate, magnesium carbonate, titanium dioxide, iron oxide, chromium oxide, zinc oxide, chrome green, chrome yellow, Prussian blue, cadmium yellow, cadmium red, carbon black, and so forth.

Soluble coloring materials such as, for example, oil soluble and alcohol soluble dyes may be incorporated. Usually dyestuffs will be used in quantities less than about 0.2% of the injection molding powder.

The compositions of this invention are preferably prepared entirely without the use of volatile solvents. Injection molding powders entirely free of volatile solvents are thereby obtained. For example, the ingredients of the composition may be mixed in lump or powder form and colloided in a suitably heated Banbury mill. In this procedure, the ingredients are charged into the heated mill and colloided in the usual manner, except, it is to be noted, no volatile solvents are used. The colloided mass is removed from the Banbury mill and rolled into a sheet while still hot. The sheet is broken up and reduced to the usual form of coarsely granulated or more or less pulverulent molding powders by means of a rotating knife mill, hammer mill, or other suitable reducing means. The term "injection molding powder" as used herein and in the claims includes the more or less pulverulent molding powders, chips, and coarsely granulated particles, all of which may be referred to as granules, suitable for ready feeding to the usual injection molding machine. In general, at least 80% of the injection molding powder will pass through a two mesh screen and be retained in a 100 mesh screen; preferably, the powder is uniform in particle size with at least 60% of a size to pass through a 10 mesh screen but be retained on a 40 mesh screen.

A typical procedure for compounding the molding powder ingredients in a Banbury mill is to mix the ingredients roughly and add them to the Banbury mill which is maintained at a temperature of the order of about 280 to about 330° F. Pressure is applied to the floating plug and the mass is mixed until it is homogeneous. A mixing period between about 8 and about 15 minutes is usually sufficient. If desired, the rotors and the jacket of the mill are cooled slightly at the end of the homogenizing period to facilitate discharge from the mill. The hot colloided mass is removed from the Banbury mill and is then immediately sheeted on a hot two roll mill. The sheet is then allowed to cool after which it is reduced to an injection molding powder in a hammer mill. This specific procedure is suitable for the compositions given in the examples included in this specification.

Alternatively, the ingredients of the injection molding powder may be colloided by rolling on a suitably heated differential two roll mill of the type well known in the plastic art. In a typical procedure the roughly mixed ingredients are placed on the mill with the rolls at a temperature of the order of about 280° to about 330° F. Colloiding occurs rapidly. The mass is cut and worked on the rolls until completely homogeneous. This usually requires about 10 to about 15 minutes. The slower roll is usually then cooled until the plastic mass adheres entirely to the other roll. The plastic is then stripped from the mill as a sheet and is reduced to a molding powder after it is cooled. Other known methods of compounding such as the celluloid process may, of course, be utilized.

The injection molding powders in accordance with this invention may be injected by injection molding procedures well known to the art. The temperature required will vary somewhat with the particular composition employed. However, the molding temperature is readily found merely by increasing temperature until a homogeneous tough molding is obtained. Usually the injection molding powder according to this invention will inject satisfactorily at temperatures between about 350° F. and about 400° F. using a pressure between about 800 and about 2000 lbs./sq. inch.

In the following examples, there are presented typical formulae for injection molding powders in accordance with this invention. All parts and percentages in the examples, specification, and claims are by weight.

Tables I and II give typical formulae, ingredients of which may be colloided and converted to molding powder using a Banbury mill for the mixing operations, a two roll mill for sheeting the colloided hot plastic mass obtained therefrom, and a hammer mill to disintegrate the sheets to molding powder.

Table I

| | Example No. | | | | | | | | | |
|---|---|---|---|---|---|---|---|---|---|---|
| | 1 | 2 | 3 | 4 | 5 | 6 | 7 | 8 | 9 | 10 |
| Ethyl cellulose (47.9% ethoxyl) (viscosity 95) | 80 | 80 | 80 | 80 | 80 | 80 | 80 | 80 | ---- | 80 |
| Ethyl cellulose (47.9% ethoxyl) (viscosity 101) | ---- | ---- | ---- | ---- | ---- | ---- | ---- | ---- | 80 | ---- |
| Batavia gum | 20 | ---- | ---- | ---- | ---- | ---- | ---- | ---- | ---- | ---- |
| N rosin | ---- | 20 | ---- | ---- | ---- | ---- | ---- | ---- | ---- | ---- |
| Cumarone resin (Neville resin R-3) | ---- | ---- | 20 | ---- | ---- | ---- | ---- | ---- | ---- | ---- |
| Modified alkyd resin (Rezyl 775-1) | ---- | ---- | ---- | 20 | ---- | ---- | ---- | ---- | ---- | ---- |
| Oil modified alkyd resin (Duraplex O-50-LV) | ---- | ---- | ---- | ---- | 20 | ---- | ---- | ---- | ---- | ---- |
| Nondrying oil modified alkyd resin (Beckosol 24) | ---- | ---- | ---- | ---- | ---- | 20 | ---- | ---- | ---- | ---- |
| Ester gum | ---- | ---- | ---- | ---- | ---- | ---- | 20 | ---- | ---- | ---- |
| Polymerized vinyl derivative resin (Gelva 25) | ---- | ---- | ---- | ---- | ---- | ---- | ---- | 20 | ---- | ---- |
| Hydrogenated rosin modified alkyd resin (Petrex 130 H) | ---- | ---- | ---- | ---- | ---- | ---- | ---- | ---- | 20 | ---- |
| Oil soluble phenolic resin (Super Beckacite 2000) | ---- | ---- | ---- | ---- | ---- | ---- | ---- | ---- | ---- | 20 |

Table I (Cont.)

| | Example No. | | | | | |
|---|---|---|---|---|---|---|
| | 11 | 12 | 13 | 14 | 15 | 16 |
| Ethyl cellulose (47.9% ethoxyl) (viscosity 95) | 80 | 80 | 80 | 80 | 80 | 80 |
| Modified phenolic resin (Lewisol 115) | ---- | 20 | ---- | ---- | ---- | ---- |
| Rosin modified terpene-maleic anhydride resin (Petrex 1) | ---- | ---- | ---- | 20 | ---- | ---- |
| Oil soluble phenolic resin (Bakelite BR-254) | 20 | ---- | ---- | ---- | ---- | ---- |
| Rosin modified glyceryl maleate resin (Beckacite 1114) | ---- | ---- | 20 | ---- | ---- | ---- |
| Hydrogenated rosin | ---- | ---- | ---- | ---- | 20 | ---- |
| Pure alkyd resin (Rezyl 337-1) | ---- | ---- | ---- | ---- | ---- | 20 |

Table II

| Example No. | 17 | 18 | 19 | 20 | 21 | 22 | 23 | 24 | 25 | 26 | 27 |
|---|---|---|---|---|---|---|---|---|---|---|---|
| Ethyl cellulose (49.3% ethoxyl) (viscosity 54) | 75 | ---- | ---- | ---- | ---- | ---- | ---- | ---- | ---- | ---- | ---- |
| Ethyl cellulose (48.1% ethoxyl) (viscosity 354) | ---- | 65 | 65 | ---- | ---- | ---- | ---- | ---- | ---- | ---- | ---- |
| Ethyl cellulose (47.9% ethoxyl) (viscosity 95) | ---- | ---- | ---- | 70 | ---- | ---- | ---- | ---- | ---- | ---- | ---- |
| Ethyl cellulose (45.7% ethoxyl) (viscosity 72) | ---- | ---- | ---- | ---- | 75 | ---- | ---- | ---- | ---- | ---- | ---- |
| Ethyl cellulose (45.6% ethoxyl) (viscosity 94.4) | ---- | ---- | ---- | ---- | ---- | 75 | ---- | ---- | ---- | ---- | ---- |
| Ethyl cellulose (44.7% ethoxyl) (viscosity 85) | ---- | ---- | ---- | ---- | ---- | ---- | 80 | ---- | ---- | ---- | ---- |
| Ethyl cellulose (44.4% ethoxyl) (viscosity 99.6) | ---- | ---- | ---- | ---- | ---- | ---- | ---- | 80 | ---- | ---- | ---- |
| Ethyl cellulose (44.2% ethoxyl) (viscosity 73.6) | ---- | ---- | ---- | ---- | ---- | ---- | ---- | ---- | 80 | ---- | ---- |
| Ethyl cellulose (44.6% ethoxyl) (viscosity 158) | ---- | ---- | ---- | ---- | ---- | ---- | ---- | ---- | ---- | 75 | 80 |
| Rosin modified terpene-maleic anhydride resin (Petrex 1) | 15 | ---- | ---- | ---- | ---- | 10 | ---- | ---- | ---- | ---- | ---- |
| Modified phenolic resin | | | | | | | | | | | |

Table II (Cont.)

| Example No. | 17 | 18 | 19 | 20 | 21 | 22 | 23 | 24 | 25 | 26 | 27 |
|---|---|---|---|---|---|---|---|---|---|---|---|
| (Lewisol 115) | | | 17.5 | | | | | | | | |
| Oil soluble phenolic resin (Durez 550) | | 17.5 | | | | | | | | | |
| Urea-formaldehyde resin (Uformite F-224) | | | | 12 | | | | | | | |
| Triphenylphosphate | | 8.75 | 8.75 | | | | | | | | |
| Raw castor oil | | 8.75 | 8.75 | | | | | | | | |
| Refined mineral oil | | | | | 3 | 10 | 10 | 10 | 7.5 | 7.5 | |
| Japan wax | | | | | 2 | 2 | 2 | 2 | 2 | 2 | 2 |
| Lithopone | | | | | 12 | | | | | | |
| Batavia dammar gum | | | | | | 15 | | | | 17 | 12.5 |
| Hydrogenated rosin | | | | | | | 15 | | | | |
| Glyceryl ester of hydrogenated rosin | | | | | | | | 12.5 | | | |
| Glyceryl ester of hydrogenated rosin containing 10% by weight of glyceryl ester of maleic acid | | | | | | | | | 12.5 | | |
| Tricresyl phosphate | | | | | | | | | | 8 | |
| Dibutyl phthalate | 10 | | | | | | | | | | 7.5 |

Table II (Cont.)

| Example No. | 28 | 29 | 30 | 31 | 32 | 33 | 34 | 35 | 36 | 37 | 38 |
|---|---|---|---|---|---|---|---|---|---|---|---|
| Ethyl cellulose (44.6% ethoxyl) (viscosity 158) | 75 | | 80 | | 75 | | | | | | |
| Ethyl cellulose (46.2% ethoxyl) (viscosity 69) | | 75 | | | | | | 80 | | | |
| Ethyl cellulose (46.5% ethoxyl) (viscosity 67.4) | | | | 75 | | | | | | | |
| Ethyl cellulose (45.6% ethoxyl) (viscosity 94.4) | | | | | | | 80 | | | | |
| Ethyl cellulose (45.2% ethoxyl) (viscosity 73.6) | | | | | | 80 | | | | | |
| Ethyl cellulose (47.0% ethoxyl) (viscosity 11) | | | | | | | | | 75 | | |
| Ethyl cellulose (47.8% ethoxyl) (viscosity 31.5) | | | | | | | | | | 75 | |
| Ethyl cellulose (45.5% ethoxyl) (viscosity 750) | | | | | | | | | | | 80 |
| Batavia dammar gum | 17 | | 12.5 | | | 12.5 | 12.5 | | 15 | 15 | |
| Sorbitol ester resin (Atlas 311-B) | | | | 15 | | | | | | | |
| Rosin modified terpene-maleic anhydride resin (Petrex 1) | | 13 | | | | | | | | | |
| Refined mineral oil (Fractol A) | | | 7.5 | 5 | | | | | 10 | | |
| Ethyl orthobenzoyl benzoate | | | | 5 | | | | | | | |
| Dibutyl phthalate | | | | | | | | | | | |
| Camphor | 8 | | | | 8 | | | | | | |
| Triphenyl phosphate | | 10 | | | | | | | | | 10 |
| Japan wax | 2 | 1 | | 2 | | 2 | 2 | 2 | | | |
| Stearic acid | | 1 | | | | | | | | | |
| Montan wax | | | | 2 | | | | | | | |
| Hydrogenated rosin | | | | | | 17 | | | 12.5 | | |
| Purified mineral oil (Fractol A) | | | | | | 7.5 | 7.5 | 7.5 | | | |
| Nondrying oil modified alkyd resin (Beckosol 24) | | | | | | | | | | 10 | |
| Oil reactive pure phenolic (Amberol ST-137) | | | | | | | | | | | 10 |
| Zinc stearate | | | | | | | | | | | 3 |
| Titanium dioxide | | | | | | | | | | | 2 |

The injection molding powders of this invention possess in combination the advantageous properties of good flow in the molding operation and yet substantially no cold flow under moderate stress at the temperatures of use. Moldings produced therefrom are strong and tough due to the advantageous colloidal structure derived from good flow in the molding step and the subsequent formation of a gel structure upon cooling. Futhermore, the moldings are hard and may be buffed, polished, sanded, etc. readily without danger of pick-up of the surface or smearing in the polishing operation. The compositions are stable, do not discolor, embrittle, or change chemically with time. Also they are chemically resistant. Since the combinations utilized are inherently free of the tendency to cold flow, moldings prepared from the injection molding powders of this invention do not warp, shrink, or crack around inserts. Furthermore, they do not suffer from surface dulling caused by plasticizer evaporation.

The injection molding powders are useful for the manufacture of a wide variety of molded articles. Their use is especially valuable where permanent accurate dimensions are desired and where inserts are used, for example, in ophthalmic and other optical mountings, in household articles such as cutlery handles, drinking cups, plates, coasters, etc. which must withstand hot soap solutions without warping or cracking.

It will be understood that the details and examples hereinbefore set forth are illustrative only, and that the invention as broadly described and claimed is in no way limited thereby.

What we claim and desire to protect by Letters Patent is:

1. An injection molding powder consisting of substantially solvent-free granules comprising in homogeneous colloided form between about 65% and about 90% of an ethyl ether of cellulose having an ethoxyl content in the range between about 43% and about 50% and between about 5% and about 35% of a resin possessing solvent action for said ethyl cellulose at a temperature in the range of 350–400° F. and substantially no solvent action for said ethyl cellulose at temperatures of about 100° F. and from 0% to 17.5% of a solvent plasticizer.

2. An injection molding powder consisting of substantially solvent-free granules comprising essentially of between about 65% and about 90% of an ethyl ether of cellulose having an ethoxyl content in the range between about 43% and about 50% and a viscosity characteristic above about 50 and between about 10% and about 35% of a resin compatible therewith and possessing solvent action for said ethyl cellulose at a temperature in the range of 350–400° F. and substantially no solvent action for said ethyl cellulose at temperatures of about 100° F. and from 0% to 17.5% of a solvent plasticizer.

3. An injection molding powder consisting of substantially solvent-free granules comprising in homogeneous colloided form between about 65% and about 90% of an ethyl ether of cellulose having an ethoxyl content in the range between about 43% and about 50%; between about 5% and about 35% of a resin possessing solvent action for said ethyl cellulose at a temperature in the range of 350–400° F. and substantially no solvent action for said ethyl cellulose at temperatures of about 100° F.; and from 0% to 17.5% of a solvent plasticizer; and filler in quantity no more than about 25%.

4. An injection molding powder consisting of substantially solvent-free granules comprising in homogeneous colloided form between about 65% and about 90% of an ethyl ether of cellulose having an ethoxyl content in the range between about 43% and about 50%; between about 5% and about 35% of a resin possessing solvent action for said ethyl cellulose at a temperature in the range of 350–400° F. and substantially no solvent action for said ethyl cellulose at temperatures of about 100° F.; and from 0% to 17.5% of a solvent plasticizer; and a waxy substance in quantity no more than about 5%.

5. An injection molding powder consisting of substantially solvent-free granules comprising in homogeneous colloided form between about 65% and about 90% of an ethyl ether of cellulose having an ethoxyl content in the range between about 43% and about 50%; between about 5% and about 35% of a resin possessing solvent action for said ethyl cellulose at a temperature in the range of 350–400° F. and substantially no solvent action for said ethyl cellulose at temperatures of about 100° F.; and a solvent plasticizer in a quantity no more than about 17.5%.

6. An injection molding powder consisting of substantially solvent-free granules comprising in homogeneous colloided form between about 65% and about 90% of an ethyl ether of cellulose having an ethoxyl content in the range between about 43% and about 50%; between about 5% and about 35% of a resin possessing solvent action for said ethyl cellulose at a temperature in the range of 350–400° F. and substantially no solvent action for said ethyl cellulose at about 100° F.; and from 0% to 17.5% of a solvent plasticizer; a non-volatile mineral oil and a vegetable wax, the vegetable wax being in quantity no greater than about 5% and the total of ingredients exclusive of ethyl cellulose and said resin being in quantity no greater than about 25%.

7. An injection molding powder consisting of substantially solvent-free granules comprising in homogeneous colloided form:

| | Per cent |
|---|---|
| Ethyl ether of cellulose having an ethoxyl content of 43–50% | About 65 to about 90 |
| A resin possessing both solvent action at 350–400° F. and substantially no solvent action at about 100° F. for said ethyl cellulose | About 5 to about 35 |
| Non-volatile liquid non-solvent filler | 0 to about 20 |
| Molding lubricant | 0 to about 5 |
| Non-waxy solid filler | 0 to about 5 |
| Solvent plasticizer | 0 to about 17.5 | in which the sum of the last four ingredients is no more than about 25%.

8. An injection molding powder consisting of substantially solvent-free granules comprising in homogeneous colloided form:

| | Per cent |
|---|---|
| Ethyl ether of cellulose having an ethoxyl content of 44–47% and a viscosity characteristic above about 50 | About 70 to about 85 |
| A resin possessing both solvent action at 350–400° F. and substantially no solvent action at about 100° F. for said ethyl cellulose | About 10 to about 20 |
| Non-volatile liquid non-solvent filler | 5 to about 15 |
| Molding lubricant | 0 to about 5 |
| Non-waxy solid filler | 0 to about 5 |
| Solvent plasticizer | 0 to about 15 | in which the sum of the last four ingredients is no more than about 25%.

9. An injection molding powder consisting of substantially solvent-free granules comprising in homogeneous colloided form between about 65% and about 90% of an ethyl ether of cellulose having an ethoxyl content in the range between about 43% and about 50%, and between about 5% and about 35% of a resin containing a compound selected from the group consisting of natural resin acids, hydrogenated natural resin acids, derivatives of natural resin acids, and derivatives of hydrogenated natural resin acids, the said resin possessing, in combination, solvent action for said ethyl cellulose at a temperature in the range of 350–400° F. and substantially no solvent action for said ethyl cellulose at about 100° F. and from 0% to 17.5% of a solvent plasticizer.

10. An injection molding powder consisting of substantially solvent-free granules comprising in homogeneous colloided form between about 65% and about 90% of an ethyl ether of cellulose having an ethoxyl content in the range between about 43% and about 50%, and between about 5% and about 35% of a resin containing a compound selected from the group consisting of rosin acids, hydrogenated rosin acids, derivatives of rosin acids, and derivatives of hydrogenated rosin acids, and possessing, in combination, solvent action for said ethyl cellulose at a temperature in the range of 350–400° F. and substantially no solvent action for said ethyl cellulose at about 100° F. and from 0% to 17.5% of a solvent plasticizer.

11. An injection molding powder as claimed in claim 7 wherein the resin contains a compound selected from the group consisting of rosin acids, hydrogenated rosin acids, derivatives of rosin acids, and derivatives of hydrogenated rosin acids.

12. An injection molding powder consisting of granules comprising in homogenized colloided form:

| | Per cent by weight |
|---|---|
| Ethyl cellulose having an ethoxyl content of 44–47% and a viscosity characteristic above about 50 | 70–85 |
| Dammar gum | 10–20 |
| Non-volatile liquid refined mineral oil | 5–15 |
| Wax | 0–5 |
| Coloring material | 0–5 |
| Solvent plasticizer | 0–17.5 |

13. An injection molding powder consisting of granules comprising in homogenized colloided form:

| | Parts by weight |
|---|---|
| Ethyl cellulose having an ethoxyl content of about 46% and a viscosity characteristic of about 70 | About 75 |
| Dammar gum | About 15 |
| Non-volatile liquid refined mineral oil | About 10 |
| Japan wax | About 2 | said granules being substantially free of solvent plasticizer.

14. An injection molding powder consisting of granules of a colloided homogeneous composition comprising:

| | Per cent by weight |
|---|---|
| Ethyl cellulose having an ethoxyl content of about 44–47% and a viscosity characteristic above about 50 | 70–85 |
| Glycerol ester of hydrogenated rosin | 10–20 |
| Non-volatile liquid refined mineral oil | 5–15 |
| Wax | 0–5 |
| Coloring material | 0–5 |
| Solvent plasticizer | 0–17.5 |

15. An injection molding powder consisting of granules of a colloided homogeneous composition comprising:

| | Parts by weight |
|---|---|
| Ethyl cellulose having an ethoxyl content of about 44.5% and a viscosity characteristic of about 100 | About 80 |
| Glycerol ester of hydrogenated rosin | About 12.5 |
| Non-volatile liquid refined mineral oil | About 7.5 |
| Wax | About 2 | said granules being substantially free of solvent plasticizer.

16. An injection molding powder consisting of granules comprising in homogenized colloided form:

| | Per cent by weight |
|---|---|
| Ethyl cellulose having an ethoxyl content of 44–47% and a viscosity characteristic above about 50 | 70–85 |
| Rosin modified terpene maleic anhydride condensate polyhydric alcohol alkyl resin | 10–20 |
| Non-volatile liquid mineral oil | 5–15 |
| Wax | 0–5 |
| Coloring material | 0–5 |
| Solvent plasticizer | 0–17.5 |

17. An injection molding powder consisting of substantially solvent-free granules comprising in homogeneous colloided form between about 65% and about 90% of an ethyl ether of cellulose having an ethoxyl content in the range between about 43% and about 50% and between about 5% and about 35% of a resin possessing solvent action for said ethyl cellulose at a temperature in the range of 350–400° F. and substantially no solvent action for said ethyl cellulose at temperatures of about 100° F., said powder containing no solvent plasticizer for said ethyl cellulose.

DAVID R. WIGGAM.
WILLIAM KOCH.

CERTIFICATE OF CORRECTION.

Patent No. 2,326,812.  August 17, 1943.

DAVID R. WIGGAM, ET AL.

It is hereby certified that error appears in the printed specification of the above numbered patent requiring correction as follows: Page 5, first column, line 52, Table II, strike out the numeral "80" under Example 37 and insert the same under Example 38, same line; and second column, line 51, claim 2, after "comprising" insert --in homogeneous colloided form--; page 7, second column, line 8, claim 16, for "alkyl" read --alkyd--; and that the said Letters Patent should be read with this correction therein that the same may conform to the record of the case in the Patent Office.

Signed and sealed this 19th day of October, A. D. 1943.

(Seal)

Henry Van Arsdale,
Acting Commissioner of Patents.